United States Patent [19]

Gussmann et al.

[11] Patent Number: 5,269,936
[45] Date of Patent: Dec. 14, 1993

[54] PROCESS FOR TREATING ION EXCHANGE RESIN

[75] Inventors: Heinz W. Gussmann; John A. Du Plessis; Denys J. Everett, all of Johannesburg, South Africa

[73] Assignee: Johannesburg Consolidated Investment Co., South Africa

[21] Appl. No.: 956,839

[22] Filed: Oct. 5, 1992

Related U.S. Application Data

[63] Continuation of Ser. No. 596,852, Oct. 12, 1990, abandoned.

[30] Foreign Application Priority Data

Oct. 16, 1989 [ZA] South Africa ............... 89/7807

[51] Int. Cl.$^5$ .............................................. C02F 1/42
[52] U.S. Cl. ................................. 210/675; 210/677; 521/26
[58] Field of Search ............... 210/661, 665, 677, 678, 210/269, 275, 276, 289, 291, 670, 675; 521/26

[56] References Cited

U.S. PATENT DOCUMENTS

| | | | |
|---|---|---|---|
| 2,855,364 | 10/1958 | Roberts | 210/275 |
| 3,021,276 | 2/1962 | Mast | 210/275 |
| 3,391,078 | 7/1968 | Odland | 210/678 |
| 3,655,587 | 4/1972 | Bouchard et al. | 210/678 |
| 4,230,807 | 10/1980 | Evans | 521/26 |

FOREIGN PATENT DOCUMENTS

| | | |
|---|---|---|
| 0250626 | 1/1988 | European Pat. Off. |
| 1501308 | 2/1977 | United Kingdom |

OTHER PUBLICATIONS

S. Evans and R. M. Gomes, "Desalination of Rhine River Water by Ion Exchange", *Desalination*, vol. 19, pp. 433-438 (1976).

Y. Egozy, et al., "Waste Water Recycling by Ion Exchange: II. Partial Desalination", *Desalination*, vol. 33, pp. 333-346 (1980).

V. E. Kosmodamianskii et al., "Investigation of Ion Exchange Technology with Regeneration of Weakly Basic Anion Exchange Resin by a Suspension of Lime", *Thermal Engineering*, vol. 28(3), pp. 185-188 (1981).

H. M. Bunnik, "Lime Regeneration of Weak Base Anion Exchangers", published in an unspecified forum on an unknown date prior to Oct. 12, 1990.

DUCOL Process Technical Paper, pp. 168-179, published in an unspecified forum on an unknown date prior to Oct. 12, 1990.

ESMIL International Technical Paper, "A New Development in Ion Exchange Technology, ESMIL Counterflow Ion Exchange System", published by ESMIL International BV on an unknown date prior to Oct. 12, 1990.

ESMIL Research Laboratory Technical Paper, "New Developments in Ion Exchange Technology EVMIL Systems", published by ESMIL Research Laboratory, Jul., 1977 by S. Evans.

*Primary Examiner*—Ivars Cintins
*Attorney, Agent, or Firm*—Merchant, Gould, Smith, Edell, Welter & Schmidt

[57] ABSTRACT

The present invention provides a process for treating ion exchange resin which includes the steps of firstly introducing a liquor for treating the resin in substantially vertical upflow into a treatment zone in order to produce a fluidised bed comprising the resin and insoluble particulate matter interspersed with each other, and secondly separating the resin from the particulate matter through entrainment of the latter by the liquor being withdrawn from the fluidised bed in a substantially horizontal flow direction. An apparatus for performing the process outlined above is also disclosed.

10 Claims, 2 Drawing Sheets

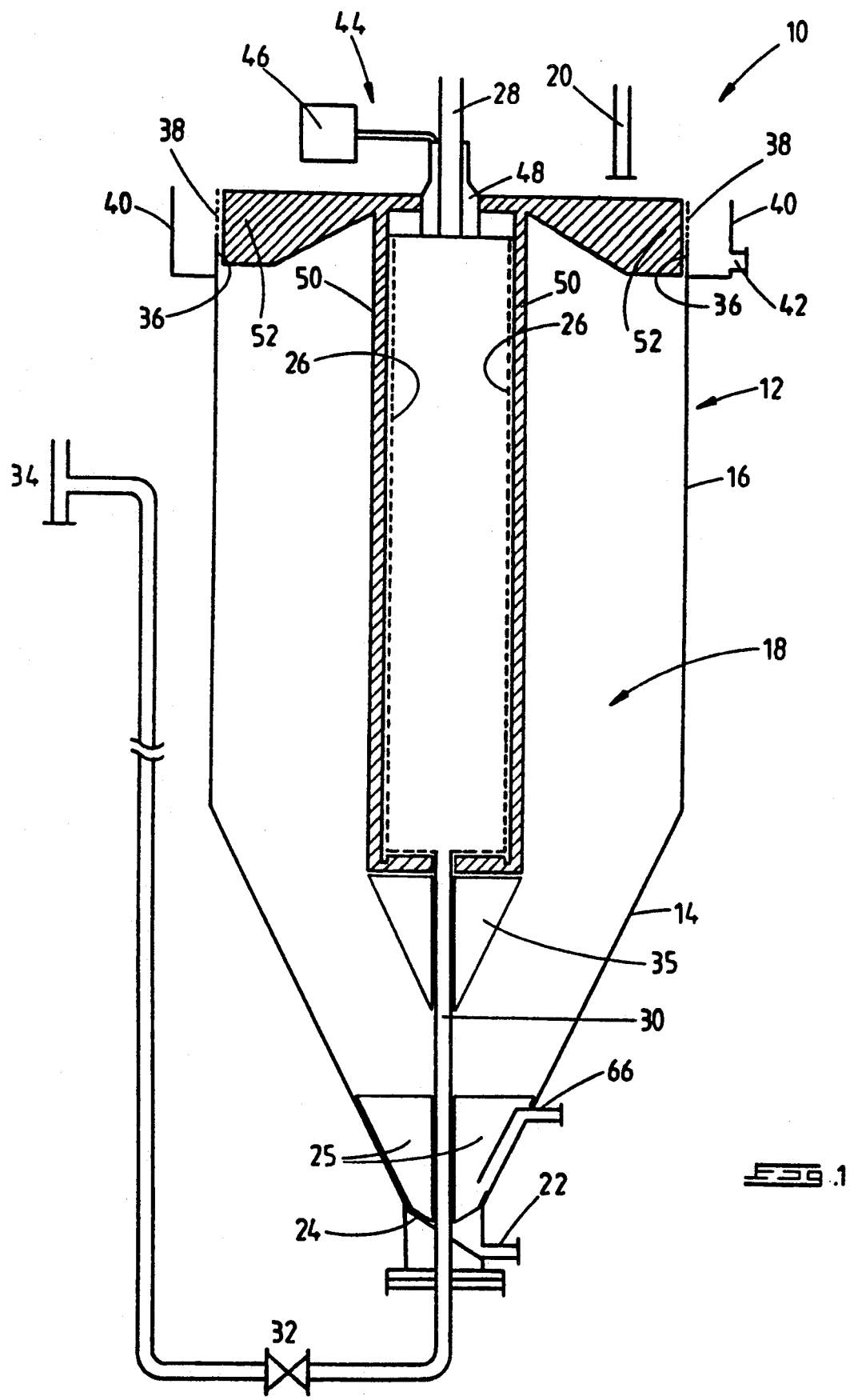

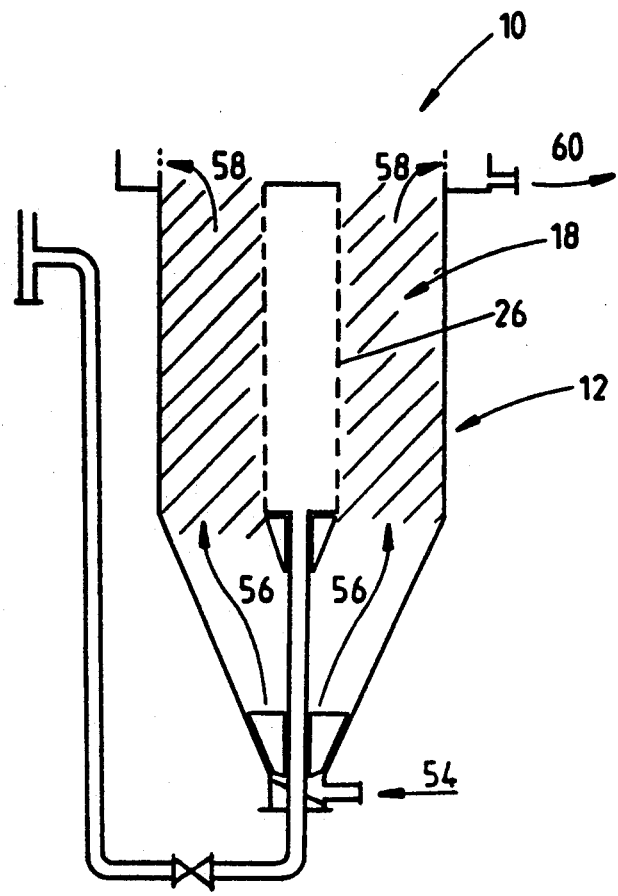
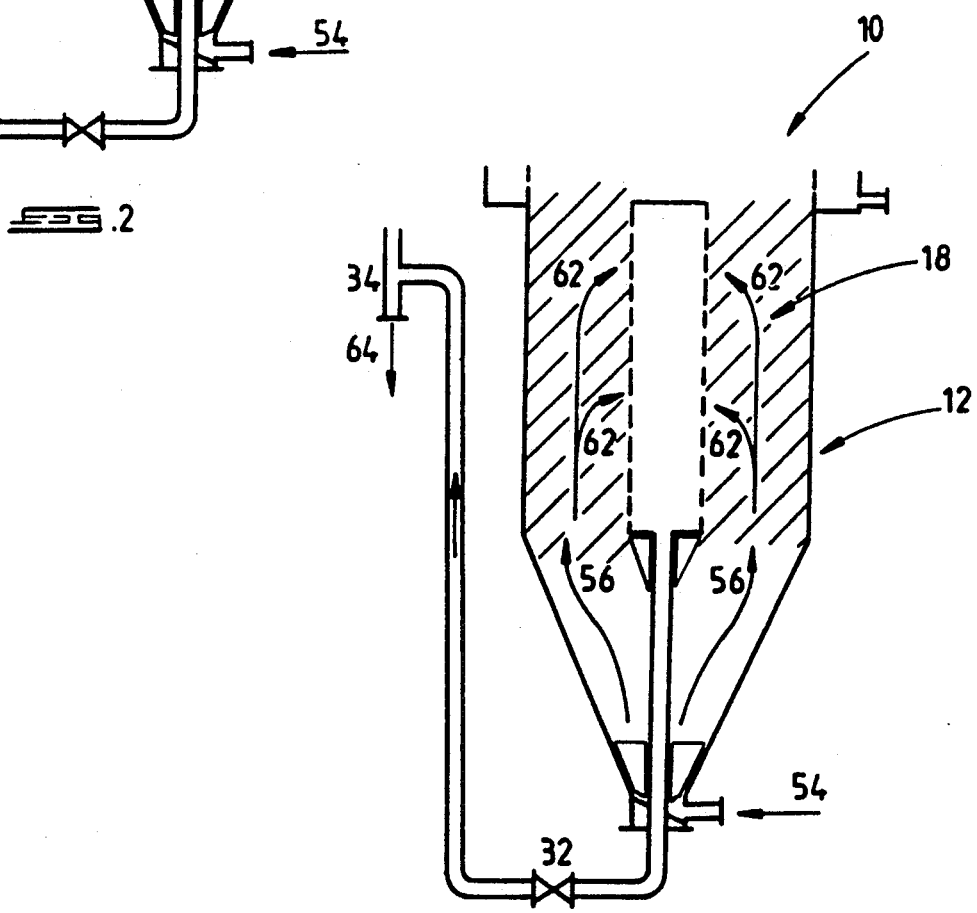

PROCESS FOR TREATING ION EXCHANGE RESIN

This is a continuation of U.S. patent application Ser. No. 07/596,852, filed Oct. 12, 1990, now abandoned.

FIELD OF THE INVENTION

This invention relates to a process and apparatus for treating ion exchange resin. More particularly the process and apparatus are directed at removing interspersed insoluble particulate matter from the resin.

BACKGROUND OF THE INVENTION

The use of ion exchange resins, usually in the form of spherical beads, for selective removal of dissolved mineral constituents from water is generally well known. These dissolved constituents may either be positively charged ions (so-called cations) or negatively charged ions (so-called anions).

The presence of certain ions in domestic and industrial waters is known to be particularly undesirable. Thus the cations of calcium ($Ca^{2+}$) and magnesium ($Mg^{2+}$) contribute to so-called "hardness" of water, while dissolved anions such as sulphate ($SO_4^{2-}$) can contribute to corrosion and scaling problems in industrial applications. The occurrence of the abovementioned ions is common in waters associated with mining operations, making disposal of such water problematic.

Ion exchange resins generally selectively adsorb cations or anions onto the surface of the resin beads and are accordingly catergorised as cationic or anionic resins. During use the resins become progressively loaded with ions being removed from the water passing the resin beads. Periodic regeneration accordingly becomes necessary in order to strip these ions from the resin in order to make it fit for use again.

Resin regeneration generally involves taking the resin out of service and bringing it into contact with an aqueous liquor containing at least one reagent capable of removing the adsorbed ions from the resin. Sulphuric acid ($H_2SO_4$) is a known suitable reagent for regenerating cationic resins, while line ($Ca(OH)_2$) is known for its use in regenerating anionic resins. The advantage of these reagents in relation to other known reagents lies in their comparatively low cost, which makes them suitable for use in large-scale water treatment installations.

Regeneration is generally effected by bringing a resin into contact with a regenerating liquor. This may be an aqueous solution of sulphuric acid or lime, depending on the type of resin being treated. In the case of a regenerating liquor comprising lime, this may only be partially dissolved, the balance being dispersed in water as finely as dispersed particles. Whereas sulphuric acid is used in regenerating liquors in a fully dissolved state, regenerating liquors comprising lime generally contain a fraction of undissolved lime particles which remain dispersed within the liquor throughout the regeneration process.

The use of the abovementioned reagents becomes problematic, however, whenever any of the ions adsorbed onto the resin insoluble products in conjunction with the regenerating reagent. The regeneration of a cationic resin loaded with calcium ions, by means of a regenerating liquor comprising sulphuric acid is a typical example. This can be illustrated by means of the following mechanism

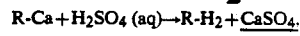

$$R\text{-}Ca + H_2SO_4\,(aq) \rightarrow R\text{-}H_2 + \underline{CaSO_4}.$$

where
- R-Ca represents the cationic resin loaded with calcium ions;
- $H_2SO_4$(aq) represents an aqueous solution of sulphuric acid, as used in the regenerating liquor;
- R-$H_2$ represents the regenerated resin; and
- $CaSO_4$ represents gypsum, which is poorly soluble in water.

The gypsum tends to precipitate from solution in the form of minute hydrated mineral particles, generally described by the chemical formula $CaSO_4 \cdot xH_2O$. These particles precipitate on the surface of the resin being regenerated, rendering the resin at least partially ineffective for further cation removal.

Anionic resin which is regenerated with an aqueous lime solution can suffer similar deterioration when it is loaded with anions such as sulphate ($SO_4^{2}$). This is illustrated by the following mechanism:

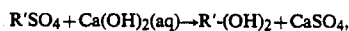

$$R'SO_4 + Ca(OH)_2(aq) \rightarrow R'\text{-}(OH)_2 + \underline{CaSO_4},$$

where
- R'-$SO_4$ represents the anionic resin loaded with sulphate ions;
- $Ca(OH)_2$(aq) represents an aqueous solution of lime, as used in a regenerating liquor;
- R-$(OH)_2$ represents the regenerated resin; and $\underline{CaSO_4}$ again represents gypsum.

The precipitation of gypsum and other insoluble products formed by similar mechanisms tends to lead to long-term resin deterioration by successive regeneration steps. This problem can be counteracted by the provision of small particles of insoluble regeneration product (so-called seeding particles) interspersed with the resin at the commencement of each regeneration step. It has been found that as further regeneration products such as gypsum are formed, these tend to precipitate preferentially on the seeding particles, leaving the resin substantially uncontaminated at the end of each regeneration step.

It is an object of the present invention to provide a process and apparatus which are particularly suited for the treatment of ion exchange resin having insoluble particulate matter such as the seeding particles, or undissolved lime particles, interspersed with it.

SUMMARY OF THE INVENTION

According to the present invention there is provided a process for treating ion exchange resin, which includes the steps of
- introducing a liquor for treating the resin in substantially vertical upflow into a treatment zone in order to produce a fluidised bed comprising the resin and insoluble particulate matter interspersed with the each other; and
- separating the resin from the particulate matter through entrainment of the latter by the liquor from being withdrawn from the fluidised bed in a substantially horizontal flow direction.

In this process the particulate matter, eg. seeding particles, may be introduced into the treatment zone together with the liquor. Separation of the particulate matter from the resin is preferably effected in a zone extending vertically into the fluidised bed.

The process described above may be followed by a further step during which at least a portion of the separated particulate matter is recovered for re-introduction into the treatment zone.

In a further aspect of the invention there is a provided an apparatus for treating ion exchange resin, which includes
- a vessel defining a resin treatment zone into which the resin is receivable;
- a liquor inlet arranged below the resin treatment zone for introducing liquor for treating the resin in substantially vertical upflow in order to allow a fluidised bed of resin to be produced in the treatment zone; and
- separating means extending into the treatment zone whereby, in use, insoluble particulate matter interspersed with the resin is allowed to be entrained from the treatment zone by the liquor flowing in a substantially horizontal flow direction while the resin is retained in this zone.

The apparatus described above may further include guide means for directing the liquor from the liquor inlet in substantially vertical upflow towards the treatment zone.

The separating means may include a screen having sufficiently small apertures for retaining the resin in the treatment zone. The separating means may be cylindrical in shape and be arranged vertically within the vessel.

DESCRIPTION OF DRAWINGS

The invention is described below by way of example with reference to the accompanying drawings, in which FIG. 1 shows in diagrammatic form a vertical section along the central axis of an apparatus according to the invention;

FIG. 2 shows a schematic flow diagram of a regeneration process according to the invention, using the apparatus of FIG. 1; and FIG. 3 shows a schematic flow diagram of a rinsing process according to the invention, using the apparatus of FIG. 1.

SPECIFIC DESCRIPTION OF AN EMBODIMENT OF THE INVENTION AND EXAMPLES OF ITS USE

In the drawings reference numeral 10 denotes generally an apparatus according to the invention. More particularly the apparatus 10 described below relates to a pilot-scale installation operated by the applicant.

The apparatus 10 includes a vessel 12 of circular cross-section having a base 14 of inverted conical shape connected below a cylindrical portion 16. In the applicant's pilot-scale unit the cylindrical portion 16 has a diameter of approximately 400 mm and a height of approximately 650 mm. The conical base 14 has a slope angle of 60°, giving the vessel 12 an overall height of approximately 1 meter.

The conical base 14 and cylindrical portion 16 together define the outer periphery of a resin treatment zone 18 into which resin is receivable via a resin inlet pipe 20 discharging into the vessel 12.

A liquor inlet 22 is connected towards the bottom of the conical base 14 in order to allow liquor for treating the resin to discharge into the lowermost portion of the conical base. A deflection plate 24 adjacent to the liquor inlet 22 is so arranged within the conical base 14 as to direct liquor issuing from the inlet 22 in an approximately vertically upward direction. Guiding vanes 25 arranged at 90 in relation to each other are fitted within the vessel 12 in order to ensure an evenly distributed upward flow of liquor.

The conical base 14 has proven to be satisfactory for the purposes of the pilot-scale installation referred to above. It is believed, however, that flat-bottomed vessels having flow distributor nozzles and/or pipes suitably arranged above their floors can be used to similar effect, particularly in large-scale installations.

The apparatus 10 is provided with separating means in the form of an internal screen 26 of circular cross-section which is held in position by a vertical support 28 connected to a cover (not shown) resting on top of the vessel 12. The screen 26 is constructed of wire of trapezoidal cross section (so-called wedge-wire) wound onto a cylindrical former (not shown) in order to provide apertures approximately 0.25 mm wide between adjacent runs of wire. In the applicant's pilot-scale apparatus the internal screen 26 has a diameter of approximately 170 mm and a height of approximately 700 mm. The screen 26 is located in co-axial arrangement with reference to the cylindrical portion 16 of the vessel 12. The treatment zone 18 accordingly comprises an annular region extending upwardly from the conical base 14.

The annular configuration of the treatment zone 18 has been found satisfactory for the purposes of the pilot-scale installation referred to above. It is believed, however, that a plurality of screens 26 arranged in a comparatively large vessel in similar orientation and spaced from each other would be equally suitable in large-scale installations. The general consideration to be observed in both the pilot-scale and the large-scale installations is that the path-length between particles interspersed with the resin in the treatment zone 18 and the separating means is kept as short as possible.

The screen 26 is sealed at its upper and lower ends and has a screen outlet pipe 30 connected to its lower end providing a liquor flow path from the screen via the lowermost level of the conical base 14 and via a control valve 32 towards a siphon-break 34. A conical unit 35 is connected to the outlet pipe 30 immediately below the screen 26 in order to provide a relatively smooth flow transition of liquor from the inlet 22 towards the annular portion of the treatment zone 18. The provision of the unit 35 has been found to reduce the degree of flow turbulence before liquor enters the treatment zone 18 during use of the apparatus 10.

An overflow weir 36 is arranged circumferentially along the upper portion of the cylindrical portion 16 of the vessel 12. A weir overflow screen 38 arranged immediately above the overflow weir 36 serves as a further separating means constructed of the same type of wedge-wire spaced apart in similar fashion as with the internal screen 26. A weir overflow launder 40 arranged adjacent to the overflow weir 36 directs liquor passing through the screen 38 towards an overflow outlet 42.

The apparatus 10 includes cleaning means having a rotatable wiper assembly 44 driven by an electrically powered motor 46. The assembly 44 is pivotally connected to the vertical support 28 of the internal screen 26 by way of a bush 48. The assembly 44 is fitted with wiper blades 50 and 52 which are swept past the internal screen 26 and the weir overflow screen 38 respectively at a rotational speed ranging from 30 to 60 revolutions per minute, in order to dislodge particles likely to foul the screen apertures.

In an illustrative process using the apparatus 10, a batch of loaded cationic resin beads is removed from the feed-end of a train of interconnected ion exchange vessels in which raw mine water is demineralised. The resin is loaded for regeneration into the vessel 12 via the resin inlet 20. In the applicant's pilot-scale unit referred to above 50 liters of resin beads constitute a suitable batch size. The cross sectional diameter of the individual resin beads is of the order of 0.5 to 1.2 mm.

A portion of the water distributed among the beads of resin in the vessel 12 is drained from it and replaced with slightly acidic rinse water, which is retained from a preceding resin regeneration cycle. Regenerating liquor for treating the resin in the vessel 12 is drawn from a stirred tank (not shown) in which seeding particles of gypsum having diameters up to 0.01 mm are kept in suspension.

In FIG. 2 flow arrow 54 schematically illustrates how the regenerating liquor is introduced into the vessel 12 via the liquor inlet 22. The liquor is diverted upwardly along a vertical flowpath by the deflection plate 24 and the guiding vanes 25, as indicated by the flow arrows 56. The liquor flow rate is sufficiently high to transport the bulk of the resin into the annular region of the resin treatment zone 18 adjacent to the screen 26.

Under the described conditions the regenerating liquor and seeding particles pass freely around herein beads being kept suspended within the liquor and spaced apart from each other in what is termed a "fluidised bed" condition. The overall volume of the resin in the fluidised condition is preferably between 150% and 200% of the volume of the resin in its unfluidised state. The hatching shown in FIG. 2 indicates the approximate location of the fluidised resin in the vessel 12.

While the control valve 32 remains shut the regenerating liquor and at least the seeding particles of relatively small cross-section leave the resin treatment zone 18 via the overflow weir 36, after separation from the resin beads by the weir screen 38, as illustrated by the flow arrows 58 in FIG. 2. The regenerating liquor and seeding particles pass along via the weir overflow launder 40 to the overflow outlet 42 as indicated by the flow arrow 60.

At the commencement of the regeneration process the regenerating liquor and entrained seeding particles, denoted by flow arrow 60 are initially recirculated via the stirred tank referred to above, back to the apparatus 10 via the liquor inlet 22 for a period of approximately 10 minutes. Sulphuric acid is then dosed into this stirred tank, where the heat of dilution generated by the addition of the acid is allowed to dissipate before the regenerating liquor is fed to the vessel 12 as indicated by the flow arrow 54. The acid dosing rate is controlled so as to maintain a pH of about 1.5 (or a conductivity of approximately 20 000 microsiemens/centimeter) on the launder outlet flow 60 while maintaining liquor recirculation as described above for a period of approximately 20 minutes. Recirculation is maintained for a further time interval of approximately 10 minutes after acid dosing has ceased.

It is generally desirable to maintain intimate contact between the regenerating liquor and the resin in its fluidised state throughout the regeneration step described above. It is believed that this objective can be met in practice by adapting the configuration of the vessel 12 and the separating means 26 shown schematically in the drawings according to the type of resin being treated and the flow conditions that are required in the resin treatment zone 18.

It has been found for example, that the cross sectional area of the annular region of the treatment zone 18 should be somewhat smaller for the cationic resin used in the applicant's pilot-scale installation than for anionic resin treatment when using similar liquor flow rates. This is mainly attributable to the relatively higher density and greater bead diameter diameter of the cationic resin used in relation to the corresponding anionic resin. A relatively higher upward liquor flow velocity is accordingly required for the treatment of the cationic resin in order to achieve satisfactory fluidisation.

The flow pattern of liquor through the treatment zone 18 may be optionally varied in the vertical direction. More particularly the treatment zone 18 may be constituted by a lower liquor distribution region immediately below the annular region described above. This region is defined by the conical base 14 in the drawings, and allows a substantially uniform distribution of liquor into the higher-lying region for resin fluidisation.

The last-mentioned region may be constricted towards its lower end (not shown in the drawings) in order to create a relatively high degree of turbulence in the lowermost portion of the fluidised resin bed. This turbulence promotes rapid mixing of the resin and the regenerating liquor entering the fluidised bed.

As the cross-sectional area of the treatment zone increases in the upward direction the upward velocity of the regenerating liquor is allowed to decrease and fluidisation becomes less vigorous. The upper region of the fluidised resin bed is usually discernible as a visible resin/liquor interface, which preferably lies below the upper edge of the overflow weir 36. The portion of the treatment zone 18 immediately above the resin/liquor interface serves as a separation zone in which relatively large particles of insoluble matter are allowed to return to the fluidised bed while the smaller particles are entrained by the liquor towards the overflow weir 36.

The region immediately adjacent to the weir 36 is termed a stilling zone, where the flow velocity of liquor is at its lowest in order to allow a substantially uniform flow of liquor across the weir.

It will be appreciated that the concentration of gypsum in the regenerating liquor is virtually at saturation level at the commencement of the regeneration step described above. The formation of further gypsum by the mechanism illustrated above will accordingly commence almost immediately when the acidic regenerating liquor reaches the fluidised resin, leading to a growth in the seeding particles within the resin treatment zone 18.

At the end of the resin regeneration step described above the control valve 32 is opened and the flow of regenerating liquor across the overflow launder 38 is diverted through the screen 26 in a horizontal flow direction as illustrated by the flow arrows 62 in FIG. 3. Acid dosing to the stirred tank is simultaneously terminated. The liquor and entrained insoluble particles in the treatment zone 18 pass through the apertures of the screen 26 in a substantially horizontal flow direction, leaving behind fluidised resin in the treatment zone 18.

The liquor subsequently flows through the outlet pipe 30, the valve 32 and into the siphon-break 34, which is so positioned that the screen 26 remains continuously immersed in upwardly flowing liquor in the vessel 12. The liquor leaving the siphon break 34 is fed to a settler (not shown) in which the entrained particles are collected in an underflow stream for final disposal. The clarified settler overflow is returned to the vessel 12 along the flow path shown by the arrow 54. A progressive removal of particulars from the fluidised bed in the treatment zone 18 is accordingly effected. This is substantially complete after a time interval of approximately 30 minutes.

The flow of clarified liquor to the vessel 12 is subsequently terminated and the resin settles into the conical base 14. The remnant liquor in the vessel 12 is drained from the vessel 12 and a stream of rinsing liquor is introduced into the vessel 12 via the liquor inlet 22 as illustrated by flow arrow 54. The rinsing liquor is directed into the resin treatment zone 18 and withdrawn from it in similar fashion as the regenerating liquor during the resin regeneration process.

It appears from the applicant's pilot-scale trials that gypsum particles of comparatively large sizes will accumulate towards the lower region of the resin treatment zone 18 in the course of the regeneration step. Smaller particles, by comparison, tend to be more readily entrained upwardly by the upflowing liquor. The configuration of the apparatus 10 allows gypsum particles of a variety of different shapes and sizes to be removed from the resin treatment zone 18. This is mainly achieved by the arrangement of the internal screen 26, which extends virtually through the entire depth of the region of the treatment zone 18 occupied by the fluidised resin bed. The apertures of the screen 26 may optionally extend to above the fluidised bed for removal of very fine particles from the treatment zone 18.

The apparatus described above allows a variety of adaptations in its construction and the flow configuration, all falling within the scope of the present invention. This invention should accordingly not be construed as being limited in scope to the embodiment and process described above.

We claim:

1. A process for regenerating an ion exchange resin partially saturated with ionic species associated with said ion exchange resin, wherein said ion exchange resin can selectively remove dissolved mineral constituents from water, said process comprising the steps of:
    (a) providing a regeneration liquor capable of producing an insoluble regeneration product in water when in conjunction with at least one of said mineral constituents;
    (b) introducing said regeneration liquor together with insoluble seeding particles derived at least partially from said insoluble regeneration product into a space containing the ion exchange resin partially saturated with ionic species associated with said ion exchange resin, wherein the regeneration liquor is introduced in substantially vertical upflow into a treatment zone within said space in order to produce a continuously fluidised bed, wherein the ion exchange resin and insoluble seeding particles are interspersed with each other so as to allow any insoluble regeneration product formed through contact between the resin and the regeneration liquor to preferentially precipitate on the seeding particles; and
    (c) separating the ion exchange resin from the insoluble seeding particles by entraining the seeding particles with the regeneration liquor through a screen having apertures of sufficiently small size to prevent the resin from escaping from the fluidised bed.

2. A process according to claim 1 wherein regeneration liquor contains an ionic species the same as that associated with the ion exchange resin in solution before the regeneration liquor is introduced into the space containing the ion exchange resin, the concentration of said ionic species in solution being sufficiently high to cause formation of insoluble regeneration product substantially simultaneously with the release of said ionic species associated with the resin.

3. A process according to claim 1 in which separation of the seeding particles from the resin is effected in a zone extending vertically into the fluidised bed.

4. A process according to claim 1 in which at least a portion of the separated seeding particles are recovered for re-introduction into the treatment zone.

5. A process according to claim 1 which includes the further steps of recovering at least a portion of the regeneration liquor withdrawn from the fluidised bed, and adding a sufficient amount of regenerating agent to return the concentration of regenerating agent within the regeneration liquor to about its original concentration, in order to allow the regeneration liquor to be reused.

6. A process according to claim 1 which includes, subsequent to step (c), the further steps of:
    (d) passing a rinsing liquor through the ion exchange resin in substantially vertical upflow in order to produce a continuously fluidised bed, wherein the ion exchange resin and said insoluble seeding particles are interspersed with each other; and
    (e) freeing the ion exchange resin from any residual seeding particles by entraining the seeding particles with the rinsing liquor through a screen extending at least midway into the fluidised bed, said screen having apertures of sufficiently small size to prevent the resin from escaping the fluidised bed.

7. A process for regenerating an ion exchange resin, wherein said ion exchange resin can selectively remove dissolved mineral constituents from aqueous fluids, said process comprising the steps of:
    (a) removing dissolved mineral constituents from the aqueous fluid with the ion exchange resin such that resin is at least partially saturated with said mineral constituents;
    (b) providing a regeneration liquor capable of producing an insoluble regeneration product when in aqueous solution with at least one of said mineral constituents;
    (c) introducing said regeneration liquor together with insoluble seeding particles into a space containing the ion exchange resin, wherein the regeneration liquor is introduced in substantially vertical upflow into a treatment zone within said space in order to produce a continuously fluidised bed, the ion exchange resin and insoluble seeding particles are interspersed with each other so as to allow any insoluble regeneration product formed through contact between the resin and the regeneration liquor to preferentially precipitate on the seeding particles, and the insoluble seeding particles provide sights for precipitation of the insoluble regeneration product; and
    (d) separating the ion exchange resin from the insoluble seeding particles by entraining the seeding particles with the regeneration liquor through a screen having apertures of sufficiently small size to prevent the passage of the ion exchange resin.

8. A process according to claim 7 wherein regeneration liquor contains an ionic species the same as that associated with the ion exchange resin in solution before the regeneration liquor is introduced into the space containing the ion exchange resin, the concentration of said ionic species in solution being sufficiently high to cause formation of insoluble regeneration product substantially simultaneously with the release of said ionic species associated with the resin.

9. A process according to claim 7 which includes the further steps of recovering at least a portion of the regeneration liquor withdrawn form the fluidised bed, and adding a sufficient amount of regenerating agent to return the concentration of regenerating agent within the regeneration liquid to about its original concentration in order to permit effective reuse of the regeneration liquor.

10. A process according to claim 7 which includes, subsequent to step (c), the further steps of:
(d) passing a rinsing liquor through the ion exchange resin in substantially vertical upflow in order to produce a continuously fluidised bed, wherein the ion exchange resin and said insoluble seeding particles are interspersed with each other; and
(e) freeing the ion exchange resin from any residual seeding particles by entraining the seeding particles with the rinsing liquor through a screen extending at least midway into the fluidised bed, said screen having apertures of sufficiently small size to prevent the resin from escaping the fluidised bed.

* * * * *